United States Patent
Zheng et al.

(10) Patent No.: US 10,308,878 B2
(45) Date of Patent: Jun. 4, 2019

(54) CATALYTIC PROCESS FOR CO-PROCESSING OF CELLULOSIC BIOMASS AND HEAVY PETROLEUM FUELS

(71) Applicant: Ying Zheng, New Maryland, NB (CA)

(72) Inventors: Ying Zheng, New Maryland (CA); Qikai Zhang, New Maryland (CA); Hongfei Lin, Nanning (CN)

(73) Assignee: Zheng Ying, New Maryland, NB (CA)

( * ) Notice: Subject to any disclaimer, the term of this patent is extended or adjusted under 35 U.S.C. 154(b) by 0 days.

(21) Appl. No.: 15/729,155

(22) Filed: Oct. 10, 2017

(65) Prior Publication Data

US 2018/0100106 A1    Apr. 12, 2018

Related U.S. Application Data

(60) Provisional application No. 62/405,374, filed on Oct. 7, 2016.

(51) Int. Cl.
*C10G 1/00* (2006.01)
*C10G 1/06* (2006.01)

(52) U.S. Cl.
CPC ............... *C10G 1/06* (2013.01); *C10G 1/002* (2013.01); *C10G 2300/1014* (2013.01); *C10G 2400/02* (2013.01); *C10G 2400/04* (2013.01); *Y02P 30/20* (2015.11)

(58) Field of Classification Search
CPC .................................... C10G 1/00; C10G 1/06
See application file for complete search history.

(56) References Cited

U.S. PATENT DOCUMENTS

| | | |
|---|---|---|
| 2010/0326880 A1 | 12/2010 | Chakka et al. |
| 2011/0120908 A1 | 5/2011 | Marzin et al. |
| 2011/0167713 A1* | 7/2011 | Quignard .................. C10G 1/08 44/307 |
| 2011/0174690 A1 | 7/2011 | Canelon et al. |
| 2012/0022307 A1* | 1/2012 | Yanik .................... C10G 1/002 585/240 |
| 2012/0289440 A1 | 11/2012 | Pollard et al. |
| 2013/0334100 A1 | 12/2013 | Mazyar et al. |
| 2014/0287469 A1 | 9/2014 | Medoff et al. |
| 2014/0343333 A1 | 11/2014 | Ginestra et al. |
| 2016/0000329 A1 | 1/2016 | Kircher et al. |

FOREIGN PATENT DOCUMENTS

WO    2008124912 A1    10/2008

OTHER PUBLICATIONS

S. De, B. Saha, R. Luque, Bioresource Technology 2015, 178, 108-118/.
R. W. Gosselink, S. A. W. Hollak, S. W. Chang, J. Van Haveren, K. P. De Jong, J. H. Bitter, D. S. Van Es, ChemSusChem 2013, 6, 1576-1594.
E. Santillan-Jimenez, M. Crocker, Journal of Chemical Technology and Biotechnology 2012, 87, 1041-1050.
S. Sorrell, J. Speirs, R. Bentley, A. Brandt, R. Miller, Energy Policy 2010, 38, 5290-5295.
A. Demirbas, Energy Conversion and Management 2009, 50, 2782-2801.
G. Anitescu, T. J. Bruno, Energy and Fuels 2012, 26, 324-348.
M. Balat, H. Balat, Energy Conversion and Management 2008, 49, 2727-2741.
S. Czernik, A. V. Bridgwater, Energy and Fuels 2004, 18, 590-598.
D. C. Elliott, Energy and Fuels 2007, 21, 1792-1815.
S. Lestari, P. Mäki-Arvela, J. Beltramini, G. M. Lu, D. Y. Murzin, ChemSusChem 2009, 2, 1109-1119.
R. J. French, J. Stunkel, S. Black, M. Myers, M. M. Yung, K. Iisa, Energy and Fuels 2014, 28, 3086-3095.
P. M. Mortensen, J. D. Grunwaldt, P. A. Jensen, K. G. Knudsen, A. D. Jensen, Applied Catalysis A: General 2011, 407, 1-19.

\* cited by examiner

*Primary Examiner* — Randy Boyer
(74) *Attorney, Agent, or Firm* — Hill & Schumacher

(57) ABSTRACT

Disclosed herein is an economically viable co-process for converting biomass to liquid biohydrocarbon fuels and for upgrading heavy deteriorate petrol-oils to high value transportation fuels. In the process, cellulose, hemi-cellulose and lignin, which are composed of ligno-cellulosic biomass, are converted to the bio-hydrocarbons (alkanes and aromatics) that are currently derived almost exclusively from fossil fuels. The resulted hydrocarbon liquid can be separated against their boiling points for gasoline, diesel and heavy oils. The heavy oils can then cracked into lower molecular weight hydrocarbons. Meanwhile, the co-processed heavy petro-fuels are partially converted into lower molecular weight hydrocarbons that fall in the boiling point range of gasoline and diesel.

19 Claims, 1 Drawing Sheet

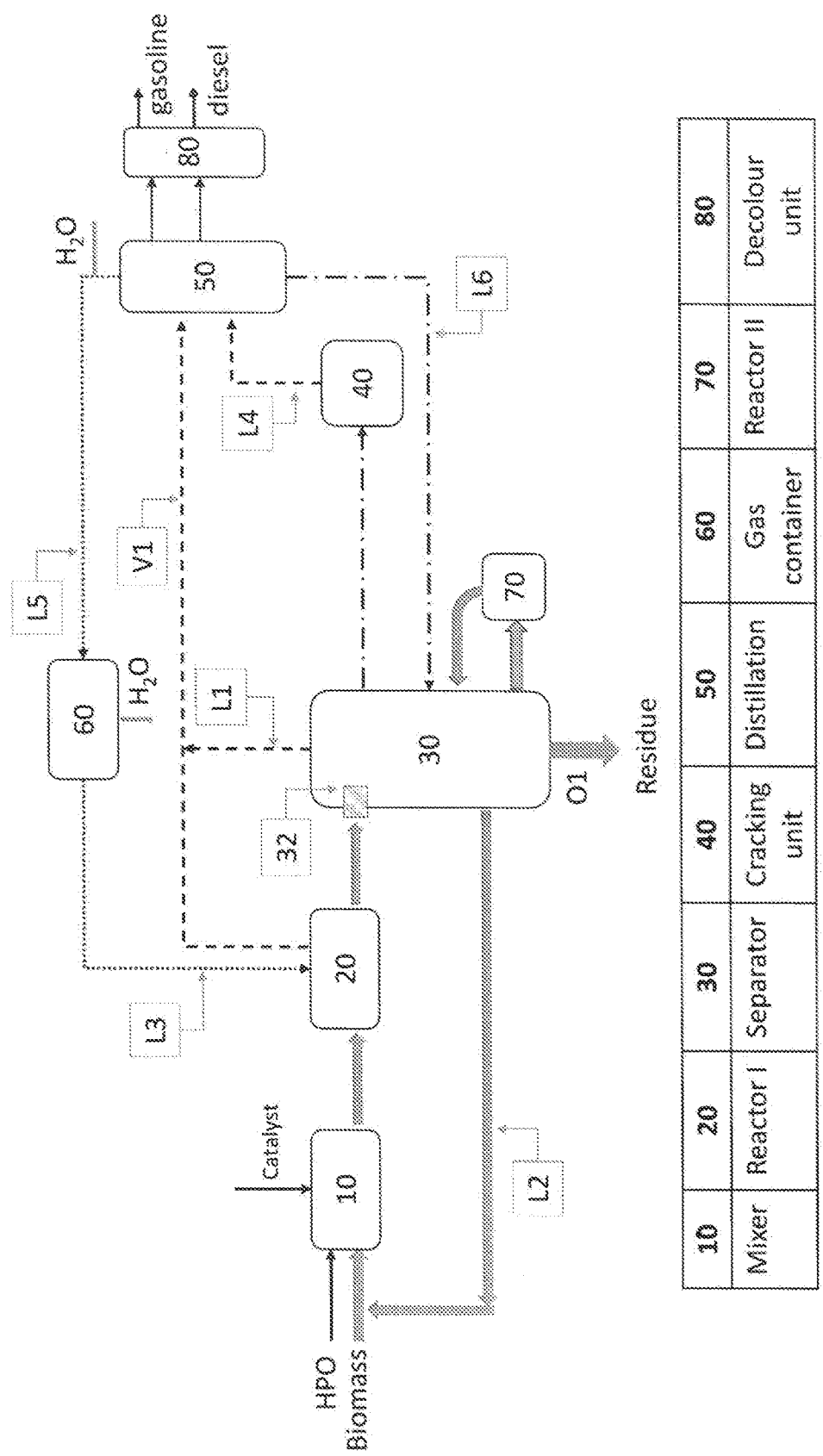

CATALYTIC PROCESS FOR CO-PROCESSING OF CELLULOSIC BIOMASS AND HEAVY PETROLEUM FUELS

FIELD

The present disclosure relates to a system and method for use in the present process for co-processing of lignocellulosic biomass and heavy petroleum fuels for production of gasoline and diesel fractions.

BACKGROUND

Crude oils from around the world are processed at the refinery to produce a variety of products, such as gasoline, diesels, jet fuel, and asphalt. The demand for transportation fuels are increasing around world and transportation fuels are the profitable products of refiners. There is a growing drive to cost-effectively maximize production of more valuable, lighter fuel products from heavy portions of every barrel of crude oil processed. For each barrel of crudes processes 10-20 wt % will leave as heavy bottoms and may be blended as heating fuels boiler fuels, which are low value fuels.

Biomass is a renewable energy resources. There is a general consensus in the scientific community that the amount of biomass that could be grown globally on a sustainable basis is comparable to the annual world-wide consumption of energy by the transportation sector. Biomass includes agricultural residues, forestry wastes, wood process wastes, and the organic fraction of municipal solid wastes. Different methods for conversion of biomass to liquid fuels were reported in the literature. The main thermochemical routes includes gasification followed by Fischer-Tropsch synthesis, pyrolysis and direct liquefaction. The gasification of biomass is a process that converts biomass into carbon monoxide and hydrogen and possibly carbon dioxide and hydrocarbon molecules such as methane. The mixture of carbon monoxide and hydrogen can be synthesized to hydrocarbon fuels and chemicals via the well-known Fischer-Tropsch method. Pyrolysis thermally decomposes dry biomass to bio-oil in a rapid heating rate to a high temperature (400-1000° C.) in the absence of oxygen. Its liquid yield can reach up to 50-70%[1, 2]. The liquid oil of fast pyrolysis consists of 20-25% water while the remainder is mostly lighter organic compounds with high oxygen content. Pyrolysis oil has low-heating value and is about half of that of crude oils[2]. Direct liquefaction operates at mild temperatures (200-450° C.) but at high pressures (>1 MPa) for a longer residence time (10-60 min)[3-5]. It has the potential for producing heavy liquid oils with increased heating values. One advantage of direct liquefaction is the ability to convert wet biomass into energy while pyrolysis deals with dry biomass only. But direct liquefaction generates a relatively low yield of liquid fuels. The biofuels derived from both pyrolysis and liquefactions are required further upgrading before they can be blended with transportation fuels.

The cost of transportation fuels produced from lignocellulosic biomass, however, is currently not competitive with the cost fuels derived from petroleum. It is imperative to develop new processes for converting biomass to biofuels that involve less number of process steps so that both the capital and operating expenses associated are reduced.

SUMMARY

The process described herein is an economically viable co-process for converting biomass to liquid biohydrocarbon fuels and for upgrading heavy deteriorate petrol-oils to high value transportation fuels. In the present invention, cellulose, hemi-cellulose and lignin, which are composed of lingo-cellulosic biomass, are converted to the bio-hydrocarbons (alkanes and aromatics) that are currently derived almost exclusively from fossil fuels. The resulted hydrocarbon liquid can be separated against their boiling points for gasoline, diesel and heavy oils. The heavy oils can then cracked into lower molecular weight hydrocarbons. Meanwhile, the co-processed heavy petro-fuels are partially converted into lower molecular weight hydrocarbons that fall in the boiling point range of gasoline and diesel.

In one embodiment of the process, lignocellulosic biomass is converted to liquid bio-hydrocarbons, via a hydrogen-free approach using one reactor or two reactors for enhanced generation of gasoline and diesel fractions. The process is operated under mild conditions without the need of extra hydrogen gas and without the need of complex separation and/or purification steps between catalysts. Importantly, the liquid biohydrocarbons produced by this version of the invention can be blended and distributed by existing petrochemical technologies and infrastructure. The liquid biohydrocarbons produced by this version of the invention are chemically similar to petroleum derived gasoline and diesel and thus it can be blended at any ratio. In this version of the invention, conversion of biomass to biohydrocarbon liquid is the primary goal so that the co-processed petroleum heavy oil can be used as carrier oil. The co-processed Petroleum heavy oil can be added to the process for once, only at the beginning of the process. The process of the conversion of biomass to biohydrocarbon liquid is maintained by the biohydrocarbon liquid produced by the lignocellulosic biomass.

In another embodiment, the same process is used to convert lignocellulosic biomass to biohydrocarbon liquid. All of the resulted gasoline and diesel fractions are collected as final products. Co-processing petroleum heavy oils may be added periodically to the process in order to maintain a pre-set oil-to-biomass ratio. In another version of the invention, the same process is used to convert heavy petroleum oil as much as possible to lower molecular weight hydrocarbons which fall in the boiling point range of gasoline and diesel. Thus, the present disclosure provides a platform technology for upgrading deteriorated heavy petroleum oil to quality gasoline and diesel fractions.

Thus, there is provided a process for co-processing of lignocellulosic biomass and heavy petroleum fuels, comprising:

mixing lignocellulosic biomass, heated heavy petroleum fuels and a metal oxide based catalyst in a mixer to produce a mixture;

flowing the mixture to a reactor maintained at a pressure in a range from about 101 kPa to about 10 kPa and maintained at a temperature in a range from about 200° C. to about 450° C. and applying external forces to the mixture to produce longitudinal waves and shear stress in the mixture wherein responsively adiabatically erupting bubbles accompanied by high temperature and pressure are produced, and wherein in-situ hydrogen is generated, and wherein lignocellulosic biomass depolymerizes thereby generating a variety of free radicals and intermediates, wherein the free radicals and intermediates react with hydrocarbon molecules in the heavy petroleum fuels such that large hydrocarbon molecules are cracked into smaller hydrocarbon molecules, and a combination of intermediate with hydrocarbon molecules and in which oxygen is eliminated in the form of CO, $CO_2$ and $H_2O$;

withdrawing gaseous products from the reactor to a distillation unit;

flowing remaining solids and liquids from the reactor to a separator and withdrawing non-condensable gas and hydrocarbons that are in the gas state at the temperature and pressure of the separator from a top of the separator to the distillation unit, removing solid residue from a bottom of the reactor, withdrawing any solid-liquid mixture from the separator and flowing the solid-liquid mixture back to the mixer; and distilling the gaseous products in the distillation unit to separate and withdraw gasoline and diesel products.

The process may further comprise flowing any liquid-solid layer formed in the separator to a second reactor for a further conversion of unreacted biomass residue and flowing the product mixture back to the separator to flash the liquid-solid layer.

The non-condensable gas products generated in the process may be fed back to the first reactor to facilitate the creation of bubbles which adiabatically implode thereby generating instant high temperature and pressure within gas bubbles and at the interface of gas-liquid interface while the apparent reaction temperature and pressure within the reactor are not changed.

The process may further comprise flowing any liquid layer formed in the separator to a cracking unit for cracking the liquids and flowing gaseous products from the cracking process to the distillation unit for distillation.

A mass ratio of biomass to heavy petroleum fuels may be in a range from about 5:1 to about 1:50.

A mass ratio of a mass ratio of catalyst to biomass is in a range from about 5:10000 to about 10:100.

The step of mixing lignocellulosic biomass, heated heavy petroleum fuels and a metal oxide based catalyst may be performed in the mixer maintained at a temperature between about 100° C. to about 200° C.

The metal oxide based catalyst may comprise one or more metal oxides from within Groups 2 through 12 of the Periodic Table. The metal oxide based catalyst may comprise one or any combination of $Cr_2O_3$, $MnO_3$, $Fe_2O_3$, $Fe_3O_4$, $CoO$, $Ni_2O_3$, $CuO$, $MoO_3$, $RuO_2$, $Re_2O_7$, $ReO_3$, $WO_3$, $MgO$, $ZnO$ and $CaO$.

The metal oxide based catalyst may be mixed with a reducible metal oxide, and this reducible metal oxide may be any one or combination of $CeO_2$, $TIO_2$, $V_2O_5$, $FeO_2$, $FeO$, $Fe_2O_3$, $CoO$, $HfO_2$, $ZrO_2$, $MnO$, $Mn_2O_3$, $MnO_3$, $Pr_2O_3$ and $Sm_2O_3$.

The metal oxide based catalyst may be mixed with any one or combination of zeolites, clay, montmorillonite, kaolinite, smectite, feldspar, micas, Bentonite, Vermiculite and illite.

The metal oxide based catalyst may be exposed, prior to mixing with the cellulosic biomass and heavy petroleum fuels, to a modifier comprising any one or combination of sulfates, phosphates, nitric acid, or ammonia and silanes thereby modifying surface moieties such as hydrogen and hydroxyl groups.

For enhanced production of gasoline and diesel, any liquid layer formed in the separator may be flowed to a cracking unit for cracking the liquids and flowing gaseous products from the cracking process to the distillation unit for distillation.

A further understanding of the functional and advantageous aspects of the present disclosure can be realized by reference to the following detailed description and drawings.

BRIEF DESCRIPTION OF THE DRAWINGS

Embodiments disclosed herein will be more fully understood from the following detailed description thereof taken in connection with the accompanying drawings, which form a part of this application, and in which:

FIG. 1 is a schematic representation of an apparatus used in the present process for co-processing of lignocellulosic biomass and heavy petroleum fuels.

DETAILED DESCRIPTION

Various embodiments and aspects of the disclosure will be described with reference to details discussed below. The following description and drawings are illustrative of the disclosure and are not to be construed as limiting the disclosure. The drawings are not to scale. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions.

The present disclosure provides an embodiment of a process for co-processing of lignocellulosic biomass and heavy petroleum fuels, comprising:

mixing lignocellulosic biomass, heated heavy petroleum fuels and a metal oxide based catalyst in a mixer to produce a mixture;

flowing the mixture to a reactor maintained at a pressure in a range from about 101 kPa to about 10 kPa and maintained at a temperature in a range from about 200° C. to about 450° C. and applying external forces to the mixture to produce longitudinal waves and shear stress in the mixture wherein responsively adiabatically erupting bubbles accompanied by high temperature and pressure are produced, and wherein in-situ hydrogen is generated, and wherein lignocellulosic biomass depolymerizes thereby generating a variety of free radicals and intermediates, wherein the free radicals and intermediates react with hydrocarbon molecules in the heavy petroleum fuels such that large hydrocarbon molecules are cracked into smaller hydrocarbon molecules, and a combination of intermediate with hydrocarbon molecules and in which oxygen is eliminated in the form of $CO$, $CO_2$ and $H_2O$;

withdrawing gaseous products from the reactor to a distillation unit;

flowing remaining solids and liquids from the reactor to a separator and withdrawing non-condensable gas and hydrocarbons that are in the gas state at the temperature and pressure of the separator from a top of the separator to the distillation unit, removing solid residue from a bottom of the reactor, withdrawing any solid-liquid mixture from the separator and flowing the solid-liquid mixture back to the mixer; and distilling the gaseous products in the distillation unit to separate and withdraw gasoline and diesel products.

In an embodiment the process further comprises flowing any liquid-solid layer formed in the separator to a second reactor for a further conversion of unreacted biomass residue and flowing the product mixture back to the separator to flash liquid-solid layer.

In an embodiment the non-condensable gas products generated in the process are fed back to the first reactor to facilitate the creation of bubbles with high temperature and pressure within the reactor.

In an embodiment the process further comprises flowing any liquid layer formed in the separator to a cracking unit for cracking the liquids and flowing gaseous products from the cracking process to the distillation unit for distillation.

In an embodiment a mass ratio of biomass to heavy petroleum fuels is in a range from about 5:1 to about 1:50.

In an embodiment a mass ratio of a mass ratio of catalyst to biomass is in a range from about 5:10000 to about 10:100.

In an embodiment the step of mixing lignocellulosic biomass, heated heavy petroleum fuels and a metal oxide based catalyst is performed in the mixer maintained at a temperature between about 100° C. to about 200° C.

In an embodiment the metal oxide based catalyst comprises one or more metal oxides from within Groups 2 through 12 of the Periodic Table.

In an embodiment the metal oxide based catalyst comprises one or any combination of $Cr_2O_3$, $MnO_3$, $Fe_2O_3$, $Fe_3O_4$, $CoO$, $Ni_2O_3$, $CuO$, $MoO_3$, $RuO_2$, $Re_2O_7$, $ReO_3$, $WO_3$, $MgO$, $ZnO$ and $CaO$.

In an embodiment the metal oxide based catalyst is mixed with a reducible metal oxide.

In an embodiment the reducible metal oxide is any one or combination of $CeO_2$, $TIO_2$, $V_2O_5$, $FeO_2$, $FeO$, $Fe_2O_3$, $CoO$, $HfO_2$, $ZrO_2$, $MnO$, $Mn_2O_3$, $Mn_3O_4$, $MnO_3$, $Pr_2O_3$ and $Sm_2O_3$.

In an embodiment the metal oxide based catalyst is mixed with any one or combination of zeolites, clay, montmorillonite, kaolinite, smectite, feldspar, micas, Bentonite, Vermiculite and illite.

In an embodiment the metal oxide based catalyst is exposed, prior to mixing with the cellulosic biomass and heavy petroleum fuels, to a modifier comprising any one or combination of sulfates, phosphates, nitric acid, or ammonia and silanes thereby modifying surface moieties such as hydrogen and hydroxyl groups.

In an embodiment applying external forces to the mixture to produce longitudinal waves and shear stress in the mixture comprises rotating one or more propellers in the mixture. In an embodiment the rotation of the one or more propellers is carried out at a rotation rate in a range from about 300 revolutions per minute to about 3000 revolutions per minute.

In an embodiment, applying external forces to the mixture to produce longitudinal waves and shear stress in the mixture comprises applying any one or combination of impingement, sound energy, and electromagnetic energy to the mixture.

FIG. 1 presents a schematic diagram of an embodiment of a system for use in the present process for co-processing of lignocellulosic biomass and heavy petroleum fuels. The system includes a mixer 10 for receiving the biomass, heavy oils and catalyst. Once mixed, the mixture is fed to a reactor 20 in which the reaction occurs. Once the reaction takes place (to be described in more detail hereafter), the products plus residue is fed to separator 30, in which liquid-solid residue is optionally withdrawn to a second reactor 70 in which solid is further converted to hydrocarbons, after which liquid product may be fed to an optional cracking unit 40 if the product requires cracking, and after cracking has taken place the product is fed to a distillation unit 50 to separate and withdraw gasoline and diesel fractional products, which can be further sent to a unit 80 for decoloring.

The process moves generally from the left to the right of the diagram. Both biomass and heavy petroleum oils are feedstocks of the process. The biomass and heavy petroleum oils are co-processed together. The process allows the water content of biomass in the mixture to range from 0 up to about 30%wt. This range from 0 up to about 30%wt refers to the water content in biomass. 0% water in biomass means dry biomass that does contain free water molecules.

Biomass herein is defined as lingocellulosic organic materials, including forestry by-products, agricultural by-products and processed wood by-products, waste food etc.

Heavy petroleum oils (HPO, thereafter) include fluid catalytic cracking (FCC) slurry oil, vacuum bottoms, bunker C fuels, heating fuels, bottoms of fuel storage tanks, motor oils, lubricant oil etc.

The biomass is finely ground up before the process is initiated. The sizes of grounded biomass are preferably less than about 1cm. The biomass, heated HPO and catalysts are fed to mixer 10. The HPO is heated prior to being fed to the mixer 10 and the temperatures of the heated oils may range from about 100° C. to about 200° C. The mass ratio of biomass to HPO may vary from about 5:1 to about 1:50. The mass ratio of catalyst to biomass vary from about 5:10000 to about 10:100. In the mixer 10, biomass, HPO and catalyst are well mixed and the temperature of mixer 10 is maintained between about 100° C. to about 200° C.

The well-mixed mixture is then fed to reactor 20, where the reactions take place. External forces are applied to the mixture in reactor 20 which are designed to produce longitudinal waves and shear forces being generated in the mixture. In an embodiment these longitudinal waves are generated via rotating propellers. For example, reactor 20 may include one or more propellers which are rotated during the process. The propeller rotations per minute (rpm) may be in a range from about 300 to about 3000 rpm. It will be appreciated that these forces may be generated by mechanisms other than propellers. For example, impingement, sound energy, electromagnetic energy or combination of any of them may be applied to the mixture. In the process of impingement if the mixture is pumped in reactor 20 at high velocity and baffles are placed in the way of flow path, then the mixture containing bubbles will have to impinge on the baffles and flow through the baffles. When the mixture hits on the baffles, bubbles will break suddenly by an impinging force. The baffles could be perforated plates perpendicular to mixture flowing pathway. Baffles could be other design such as perforated half plates.

The residence time of the mixture in the reactor is between about 1 minute and 60 minutes. The mixture is vigorously mixed in the reactor 20 by the propellers. The temperature of reactor 20 is set between about 200° C. and about 450° C. The reactor 20 is connected to the distillation unit 50 via a vacuum line (denoted as V1 in FIG. 1). The pressure within reactor 20 is between in a range from about 10 kilo pascals (kPa) which are vacuum conditions to 101 kPa (atmospheric pressure). A vacuum pump is used to achieve a pressure less than 101 kPa. The resulting gaseous products and steam are continuously vacuumed to the distillation unit 50 from reactor 20 through vacuum line V1. The produced gaseous products include $CO$, $CO_2$, $CH_4$, light hydrocarbons such as $C_2H_6$, $C_2H_4$, $C_3H_8$, and other hydrocarbons (which are in the gas state at the temperature and pressure of the reactor 20).

The temperature of the separator 30 is the same as the temperature of the reactor 20. The pressure of the separator is maintained below atmospheric pressure via vacuum line V1 connected through conduit L1. The reacted mixture from reactor 20 is continuously fed to the separator 30, where the reacted mixture is fed tangentially into separator 30 and flashed (in other words partially evaporated). Separator 30 includes a tangential input 32 or feeding entrance so that when the mixture is fed or injected into the separator 30 it swirls downwards along the wall of the separator 30 and rather than directly falling down to the bottom of separator 30 so that evaporation of the mixture is maximized. The tangential inlet design is analogous to the design of the tangential gas inlet of a gas cyclone. The tangential inlet generates the swirling motion of the stream, which forces the stream spiral against the wall of separator in the down direction.

The separator 30 is connected to the vacuum gas line V1. Non-condensable gas and hydrocarbons that are in the gas state at the temperature and pressure of the separator 30 exit the separator 30 from the top of the separator 30 through a conduit L1 and are mixed into gas line V1 and then sent to distillation unit 50. The remaining liquid and solid mixture settles down to the lower part of the separator 30. There may exist three layers including a top liquid layer, a middle solid-liquid mixture and concentrated solids at the bottom of separator 30. The solids include unconverted biomass particles and catalyst particles. The concentrated solids at the bottom of separator 30 are withdrawn periodically through outlet O1 as a disposable residue when the layer reaches a certain level in the separator 30. The middle solid-liquid mixture is continuously withdrawn from the separator 30 and is fed back to the mixer 10 through conduit L2.

In an embodiment, the middle solid-liquid mixture is also withdrawn to reactor 70 in which unreacted solid residue is continuously converted to hydrocarbons and the reacted mixture is sent back to the top of separator 30 and flashed. The residence time of the liquid-solid mixture in reactor 70 is normally less than 5 minutes. The short reaction time suppressed secondary reactions so that the gasoline and diesel products are maximized. Due to addition of reactor 70, the residence time of the liquid-solid mixture in reactor 20 can also be adjusted to further limit secondary reactions so that the production of gasoline and diesel fractions are further promoted. In one embodiment, the top liquid layer is withdrawn and sent to a catalytic cracking unit 40 for maximizing the production of gasoline and diesel. In another embodiment, the catalytic cracking unit 40 is not needed and the top liquid layer is not withdrawn. The liquid and solid mixture are maximized returned back to the mixer 10.

The cracking unit 40 is used, when required, to crack heavy fractions to maximize gasoline/diesel fractions. The products generated from cracking unit 40 are sent to the distillation unit 50 for separation through conduit L4.

The distillation unit 50 is also used for separation of the products of cracking unit 40. Top products include condensed water and non-condensable gases. Water is collected for further treatment and the non-condensable gases are sent to the gas storage unit 60 through conduit L5. Gasoline and diesel fractions are side withdrawn and are collected as final products. For enhanced quality, the collected gasoline and diesel fractions may be optionally treated via a decolor unit 80. Heavy bottom products from distillation unit 50 are sent back to the separator 30 through conduit L6.

Gas storage tank 60 is used for storage of non-condensable gases generated in the process. Gas needs to be withdrawn from tank 60 when the pressure of the gas storage tank 60 becomes higher than a pre-set pressure, preferable 101 kPa gauge pressure. Non-condensable gases stored in the gas storage tank 60 are fed to reactor 20 through conduit L3.

The metal oxide catalyst systems preferred for use in the invention comprise one or more metal oxides from within Groups 2 through 12 of the periodic table. The catalysts preferably comprise one or more metals selected from the group consisting of $Cr_2O_3$, $MnO_3$, $Fe_2O_3$, $Fe_3O_4$, CoO, $Ni_2O_3$, CuO, $MoO_3$, $RuO_2$, $Re_2O_7$, $ReO_3$, $WO_3$, MgO, ZnO, CaO and mixtures thereof. The metallic catalysts are preferably in a very finely powdered state.

Another approach for catalyst selection is to combine one of the aforementioned metals with a reducible metal oxide, such as titania, ceria, or vanadia. The reducible metal oxide is used to facilitate cleavage of C—O bonds in the biomass-derived oxygenated hydrocarbon reactants.

Another approach for catalyst selection is to combine the catalysts with additional catalytic materials, such as zeolites, clay, montmorillonite, kaolinite, smectite, feldspar, micas, Bentonite, Vermiculite and illite.

The catalytic materials may also be treated, as by surface-modification, to modify surface moieties such as hydrogen and hydroxyl groups. Surface hydrogen and hydroxyl groups can cause local pH variations that may affect catalytic efficiency. It can be modified, for example, by treating it with a modifier selected from the group consisting sulfates, phosphates, nitric acid, or ammonia and silanes.

The catalyst systems used in the present process can be prepared by conventional methods known to those skilled in the art. These methods include evaporative impregnation techniques, incipient wetting techniques, chemical vapor deposition, wash-coating and the like. The method chosen to synthesize the catalyst is not particularly critical to the function of the present process.

Lingocellulosic biomass is composed of carbohydrate polymers (cellulose, hemicellulose), and an aromatic polymer (lignin). Cellulose is the prominent chemical component in lignocellulosic biomass, accounting for approximately 50% by weight. The primary structure of cellulose is evidenced as a linear homopolymer of glucose. Hydrogen bonds originated from hydroxyl groups link each glucopyranose unit and stabilize the long cellulose molecular chains. Depolymerization of cellulose chains is initiated at approximately 200° C. A variety of free radicals, such as H·, OH·, and ·$CH_2$—CHO, and intermediates such as pyran and furan derivatives (C5-6 ring-containing compounds) and aliphatic oxygenated C2-4 organic compounds and light species/gases include (such as light hydrocarbons, $H_2$, CO, $H_2O$ and $CO_2$). Thermal decomposition of lignin mainly forms aromatic compounds with guaiacyl-units or phenolic units.

In the present disclosure, waves promote the catalytic reactions to take place in reactor 20. In reactor 20, three phases, gas, liquid and solid phases, are well mixed. External forces or energy, including mechanical forces or other forces, is used to generate longitudinal waves. For instance, the propeller is partially submerged in the biomass-oil mixture, which is fed from mixer 10. When the propeller is rotated vigorously, the propeller blades break the mixture surface which causes a positive pressure on the face of the blade and a negative pressure on its back. The negative pressure on the back of blades causes vaporization of the mixture when the pressure reaches a level below the vapor pressure of the liquid at the actual reaction temperature and the vapors in the mixture to evolve into bubbles. The positive pressure on the face of the blade creates longitudinal waves when the blade moves. The longitudinal wave is also known as P-waves/compressional waves. P-waves vigorously compress and stretch the medium so that the gas bubbles are compressed and expanded so that localized high pressure and vacuum are created within the gas bubbles. The expansion of the medium creates vacuum pressure that most likely vaporizes the liquid of the mixture to form gas bubbles. Gas bubbles are also formed due to the introduction of non-condensable gas from gas storage 60. The tips of the blades create strong shear stress when the propellers rotate. The shear stresses collapse the bubbles adiabatically. When the gas bubbles burst at the gas-liquid interface, intensive energy can be generated locally and instantly. This is analogous to disruption of cavity: high temperature and high pressure can be generated locally. The to temperature within gas bubbles can increase instantly as high as 5200K and the temperature at the liquid-air interface can reach 1900K, local pressure can reach 50 MPa (Susklick K S, Ultrasound, Its Chemical, Physical, and Biological Effcts[M], New York, VCH press, 1988).

Under these conditions, chemical molecules, including light hydrocarbons within gas bubbles, hydrocarbon molecules in biomass-oil mixture and biomass-decomposed molecules may react with each other over the catalyst surface. Catalyst is in the form of fine powders and is uniformly distributed in the mixture and has a good presence at the gas-liquid interfaces when gas bubbles are burst. Thus, the gaseous products are partially made use of to produce final products so that the carbon resources are fully utilized. Under these conditions, the reactions such as hydrodeoxygenation, hydrogenation and hydrocracking, can take place. Therefore, the biomass decomposed oxygenates are converted to hydrocarbons and co-processed heavy hydrocarbon are partially cracked to lighter hydrocarbons.

In reactor 20, the biomass particles are immersed in hydrocarbon liquid. At a pre-set reaction temperatures ranging 200° C. and 450° C., lignocellulosic biomass starts to depolymerize so that a variety of free radicals and intermediates are generated. The free radicals and intermediates depolymerized from the biomass are very active. Within the gas bubbles and at the gas-liquid interface, high temperature and pressure are created when the gas bubbles are collapsed adiabatically. The radicals and intermediates are ready to react with hydrocarbon molecules and each other: large hydrocarbon molecules may be cracked into smaller molecules and a combination of intermediate with hydrocarbon molecules; and as well intermediates react with each other. Meanwhile, hydrocarbon molecules also function as a capping agent to quench excessive radicals. For instance, when radicals react with hydrocarbon molecules, the radicals may combine with the hydrocarbon molecules to form new stable molecules; or due to the presence of radicals, the hydrocarbons are partially cracked into smaller hydrocarbon molecules, which boiling points may fall in the range of gasoline and diesel and meanwhile, the radicals may combine with the cracked hydrocarbon molecules to form stable molecules.

In reactor 20, the gaseous components include $H_2$, CO, $H_2O$ and $CO_2$. Water gas shift reaction ($CO+H_2O \rightarrow CO_2 + H_2$) may take place over the catalysts at operating conditions and at the gas-liquid interface where high temperature and pressure may occur locally. The generated in-situ hydrogen is very active. Over catalysts, in-situ hydrogen reacts with C—O (to remove oxygen), C—C (to crack large hydrocarbon molecules) and C=C (to saturate the C=C bonds). With the in-situ hydrogen, deoxygenation, hydrogenation and hydrocracking are promoted. Finally, CO and light hydrocarbons in the gaseous products are made use in the reaction. Carbon resource utilization is highly promoted.

The advantages of the present process are, (1) it uses heavy hydrocarbons to wet the biomass; (2) localized high and low pressure region; (3) makes use of internally generated in-situ hydrogen; and (4) employs inexpensive catalysts.

The present process is completely different from other biomass depolymerization processes. The present process combines biomass depolymerization, interaction with hydrocarbon molecules and deoxygenation in one reactor at mild reaction temperatures and the pressure may be much lower than 101 kPa. Due to longitudinal waves and shear stress created in the reactor, gas bubbles are collapsed adiabatically and at the same time, high temperature and pressure are produced within the gas bubbles and at the gas-liquid interface. It is the local extreme reaction conditions that drive the reactions to take place to convert biomass-decomposed molecules to hydrocarbon molecules.

Deoxygenation requires no pressurized hydrogen gas, and can significantly reduce both operating and capital costs of the traditional hydrotreating process. The presence of a vacuum environment in the reactor 20 is to ensure that the produced light hydrocarbons are drawn from the reaction so that secondary reaction is eliminated. The presence of a vacuum environment in the reactor 20 is also to enhance disruption of gas bubbles and to promote the reaction.

REFERENCES

[1] a) S. De, B. Saha, R. Luque, *Bioresource Technology* 2015, 178, 108-118; b) R. W. Gosselink, S. A. W. Hollak, S. W. Chang, J. Van Haveren, K. P. De Jong, J. H. Bitter, D. S. Van Es, *ChemSusChem* 2013, 6, 1576-1594; c) E. Santillan-Jimenez, M. Crocker, *Journal of Chemical Technology and Biotechnology* 2012, 87, 1041-1050; d) S. Sorrell, J. Speirs, R. Bentley, A. Brandt, R. Miller, *Energy Policy* 2010, 38, 5290-5295.

[2] A. Demirbas, *Energy Conversion and Management* 2009, 50, 2782-2801.

[3] a) G. Anitescu, T. J. Bruno, *Energy and Fuels* 2012, 26, 324-348; b) M. Balat, H. Balat, *Energy Conversion and Management* 2008, 49, 2727-2741.

[4] a) S. Czernik, A. V. Bridgwater, *Energy and Fuels* 2004, 18, 590-598; b) D. C. Elliott, *Energy and Fuels* 2007, 21, 1792-1815; c) S. Lestari, P. Mäki-Arvela, J. Beltramini, G. M. Lu, D. Y. Murzin, *ChemSusChem* 2009, 2, 1109-1119.

[5] a) R. J. French, J. Stunkel, S. Black, M. Myers, M. M. Yung, K. lisa, *Energy and Fuels* 2014, 28, 3086-3095; b) P. M. Mortensen, J. D. Grunwaldt, P. A. Jensen, K. G. Knudsen, A. D. Jensen, *Applied Catalysis A: General* 2011, 407, 1-19.

Therefore what is claimed is:

1. A process for co-processing of lignocellulosic biomass and heavy petroleum fuels, comprising:

mixing lignocellulosic biomass, heated heavy petroleum fuels and a metal oxide based catalyst in a mixer to produce a mixture;

flowing the mixture to a reactor maintained at a pressure in a range from about 101 kPa to about 10 kPa and maintained at a temperature in a range from about 200° C. to about 450° C. and applying external forces to the mixture to produce longitudinal waves and shear stress in the mixture wherein responsively adiabatically erupting bubbles accompanied by high temperature and pressure are produced, and wherein in-situ hydrogen is generated, and wherein lignocellulosic biomass depolymerizes thereby generating a variety of free radicals and intermediates, wherein the free radicals and intermediates react with hydrocarbon molecules in the heavy petroleum fuels such that large hydrocarbon molecules are cracked into smaller hydrocarbon molecules, and a combination of intermediate with hydrocarbon molecules and in which oxygen is eliminated in the form of CO, $CO_2$ and $H_2O$;

withdrawing gaseous products from the reactor to a distillation unit;

flowing remaining solids and liquids from the reactor to a separator and withdrawing non-condensable gas and hydrocarbons that are in the gas state at the temperature and pressure of the separator from a top of the separator to the distillation unit, removing solid residue from a bottom of the reactor, withdrawing any solid-liquid mixture from the separator and flowing the solid-liquid mixture back to the mixer; and distilling the gaseous products in the distillation unit to separate and withdraw gasoline and diesel products.

2. The process according to claim 1, further comprising flowing any liquid-solid layer formed in the separator to a second reactor for a further conversion of unreacted biomass residue and flowing the product mixture back to the separator to flash liquid-solid layer.

3. The process according to claim 1, wherein the non-condensable gas products generated in the process are fed back to the first reactor to facilitate the creation of bubbles with high temperature and pressure within the reactor.

4. The process according to claim 1, further comprising flowing any liquid layer formed in the separator to a cracking unit for cracking the liquids and flowing gaseous products from the cracking process to the distillation unit for distillation.

5. The process according to claim 1, wherein a mass ratio of biomass to heavy petroleum fuels is in a range from about 5:1 to about 1:50.

6. The process according to claim 1, wherein a mass ratio of catalyst to biomass is in a range from about 5:10000 to about 10:100.

7. The process according to claim 1, wherein the step of mixing lignocellulosic biomass, heated heavy petroleum fuels and a metal oxide based catalyst is performed in the mixer maintained at a temperature between about 100° C. to about 200° C.

8. The process according to claim 1, wherein the metal oxide based catalyst comprises one or more metal oxides from within Groups 2 through 12 of the Periodic Table.

9. The process according to claim 1, wherein the metal oxide based catalyst comprises one or any combination of $Cr_2O_3$, $MnO_3$, $Fe_2O_3$, $Fe_3O_4$, CoO, $Ni_2O_3$, CuO, $MoO_3$, $RuO_2$, $Re_2O_7$, $ReO_3$, $WO_3$, MgO, ZnO and CaO.

10. The process according to claim 7, wherein the metal oxide based catalyst is mixed with a reducible metal oxide.

11. The process according to claim 8, wherein the metal oxide based catalyst is mixed with a reducible metal oxide.

12. The process according to claim 9, wherein the metal oxide based catalyst is mixed with a reducible metal oxide.

13. The process according to claim 11, wherein the reducible metal oxide is any one or combination of $CeO_2$, $TiO_2$, $V_2O_5$, $FeO_2$, FeO, $Fe_2O_3$, CoO, $HfO_2$, $ZrO_2$, MnO, $Mn_2O_3$, $Mn_3O_4$, $MnO_3$, $Pr_2O_3$ and $Sm_2O_3$.

14. The process according to claim 1, wherein the metal oxide based catalyst is mixed with any one or combination of zeolites, clay, montmorillonite, kaolinite, smectite, feldspar, micas, Bentonite, Vermiculite and illite.

15. The process according to claim 1, wherein the metal oxide based catalyst is exposed, prior to mixing with the liqnocellulosic biomass and heavy petroleum fuels, to a modifier comprising any one or combination of sulfates, phosphates, nitric acid, or ammonia and silanes thereby modifying surface moieties.

16. The process according to claim 1, wherein applying external forces to the mixture to produce longitudinal waves and shear stress in the mixture comprises rotating one or more propellers in the mixture.

17. The process according to claim 16 wherein rotation of the one or more propellers is carried out at a rotation rate in a range from about 300 revolutions per minute to about 3000 revolutions per minute.

18. The process according to claim 1, wherein applying external forces to the mixture to produce longitudinal waves and shear stress in the mixture comprises applying any one or combination of impingement, sound energy, and electromagnetic energy to the mixture.

19. The process according to claim 15, wherein the surface moieties are hydrogen groups, hydroxyl groups, or a combination thereof.

* * * * *